(12) United States Patent
Hansen

(10) Patent No.: US 8,082,760 B2
(45) Date of Patent: Dec. 27, 2011

(54) METHOD AND APPARATUS FOR THE PRODUCTION OF MAN-MADE VITREOUS FIBRE PRODUCTS

(75) Inventor: Lars Elmekilde Hansen, Roskilde (DK)

(73) Assignee: Rockwool International A/S (DK)

( * ) Notice: Subject to any disclaimer, the term of this patent is extended or adjusted under 35 U.S.C. 154(b) by 927 days.

(21) Appl. No.: 12/063,822

(22) PCT Filed: Aug. 16, 2006

(86) PCT No.: PCT/EP2006/008068
§ 371 (c)(1),
(2), (4) Date: Mar. 13, 2008

(87) PCT Pub. No.: WO2007/020065
PCT Pub. Date: Feb. 22, 2007

(65) Prior Publication Data
US 2010/0170299 A1 Jul. 8, 2010

(30) Foreign Application Priority Data
Aug. 19, 2005 (EP) .................................... 05018049

(51) Int. Cl.
*C03B 37/05* (2006.01)
(52) U.S. Cl. ................ 65/469; 65/505; 65/520; 65/521; 65/516; 65/518
(58) Field of Classification Search .................... 65/455, 65/456, 469, 505, 521, 524, 526, 516–518, 65/520; 264/8; 425/8, 131.5
See application file for complete search history.

(56) References Cited

U.S. PATENT DOCUMENTS

| | | | | |
|---|---|---|---|---|
| 2,365,970 A | * | 12/1944 | Pearee | 65/456 |
| 3,690,852 A | * | 9/1972 | Smith et al. | 427/201 |
| 3,745,060 A | * | 7/1973 | Jumentier et al. | 428/338 |

(Continued)

FOREIGN PATENT DOCUMENTS

DE 2223683 5/1972

(Continued)

OTHER PUBLICATIONS

International Search Report, PCT/EP2006/008068, Nov. 14, 2006.

*Primary Examiner* — Matthew Daniels
*Assistant Examiner* — Lisa Herring
(74) *Attorney, Agent, or Firm* — McAndrews, Held & Malloy, Ltd.

(57) ABSTRACT

A non-woven product having a core layer (32) containing dense particulate additive between adjacent layers (33) which are substantially free of additive is made by fiberizing a mineral melt on a spinner (1) comprising at least one fiberizing rotor (2, 3, 4) mounted for rotation about a substantially horizontal axis, and the resultant fibres are collected in air streams (5) as a cloud of fibres which travels towards a travelling collector (11) on which a web (14) is formed and carried out of the spinning chamber (9). Dense particles such as magnesium hydroxide are ejected from a suitable ejector (15) on to a baffle (16) by which they are deflected across the width of the chamber and lengthwise over the length of a intermediate collecting zone (B) to form the core layer (32) while the initial and final collecting zone (A and C) are substantially free of the dense particulate additive.

15 Claims, 4 Drawing Sheets

U.S. PATENT DOCUMENTS

| | | | |
|---|---|---|---|
| 4,594,086 A | * | 6/1986 | Mosnier .......................... 65/379 |
| 5,595,584 A | * | 1/1997 | Loftus et al. .................... 65/442 |
| 5,900,206 A | * | 5/1999 | Pellegrin et al. .............. 264/555 |
| 5,906,669 A | * | 5/1999 | Tonder et al. ................... 65/455 |

FOREIGN PATENT DOCUMENTS

| | | |
|---|---|---|
| EP | 0672803 | 9/1995 |
| EP | 0989103 | 9/1998 |
| EP | 0936060 | 8/1999 |
| EP | 1127032 | 3/2000 |
| EP | 1086055 | 5/2002 |
| GB | 926749 | 5/1963 |
| GB | 173523 | 4/1985 |
| WO | WO 97/32068 | 9/1997 |
| WO | WO 99/51536 | 10/1999 |
| WO | WO 00/17123 | 3/2002 |

* cited by examiner

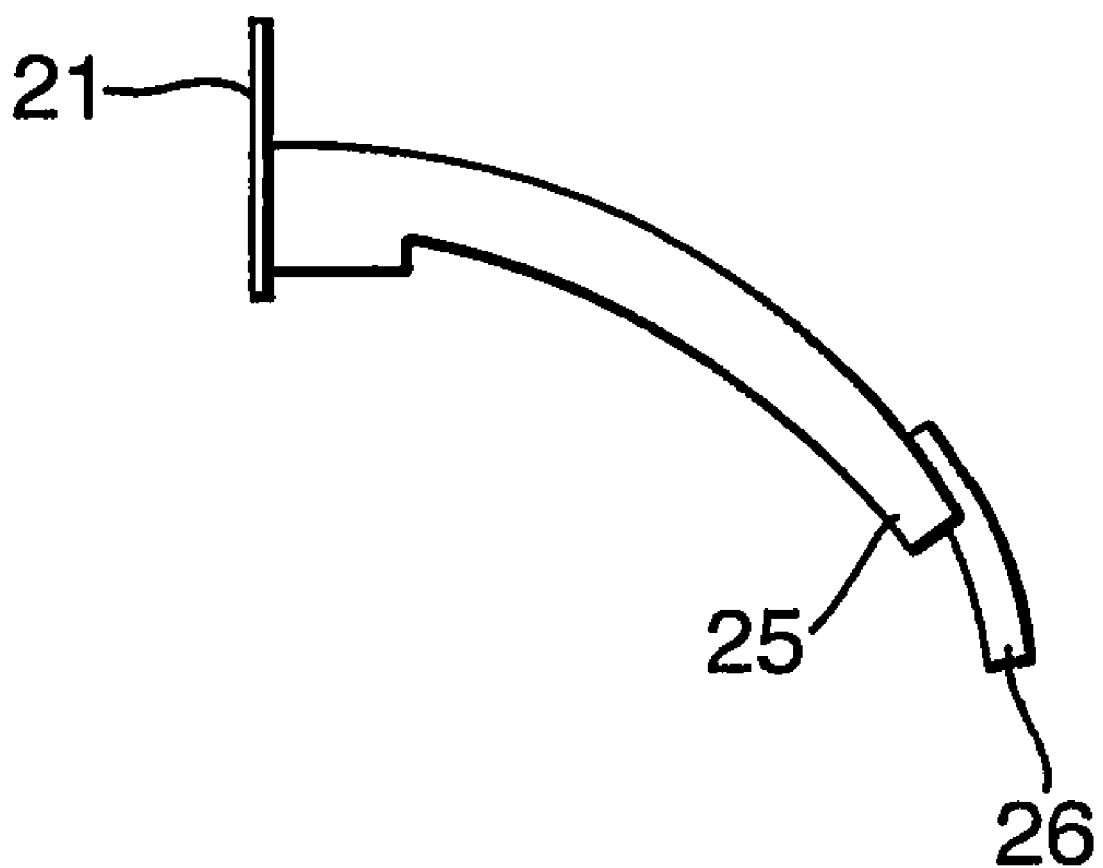

METHOD AND APPARATUS FOR THE PRODUCTION OF MAN-MADE VITREOUS FIBRE PRODUCTS

The present invention relates to man-made vitreous (MMV) fibre products which are made by air laying and which include a particulate additive material within the product for improving the performance of the product.

MMV fibre products of this general type are well known and are usually in the form of a bonded slab, usually referred to as a batt, or a shaped product such as a pipe section.

Different particulate additives are included for improving different properties. For instance fire-retardant properties are improved by including particulate fire-retardant material, acoustic properties are improved by including particulate sound-absorbing material and horticultural properties are improved by including particulate hydrophilic additives such as clay.

There have been proposals for including the additive in random or substantially uniform distribution throughout the product and there have been proposals for attempting to concentrate the additive in a particular part of the product.

In many instances it is desirable to concentrate the additive in a particular part of the thickness of the product. For instance fire-retardant particles are much more effective if they are concentrated in a core section than if they are widely spaced. It is therefore desirable to be able to control the distribution of the particulate additive through the product.

MMV fibre products are often made by centrifugal fiberisation of a melt, and there are two main ways of performing this fiberisation. In one method the melt is centrifugally fiberised using a spinner which comprises a fiberising rotor which rotates about a substantially vertical axis, and the fibres are then entrained in air which travels substantially vertically downwards as a cloud of fibres to a travelling permeable collector on which they are collected as a web. The fiberising rotor is usually a cup having orifices in its walls through which the melt is thrown centrifugally to form fibres. GB-A-2,173,523, GB-A-926,749 and EP-A-672,803 are examples of such processes in which particulate additive is incorporated into the cloud of fibres as it travels vertically downwards to the collector. U.S. Pat. No. 3,743,060 is also concerned with such systems and discloses a method of adding a particulate additive such that it becomes homogeneously distributed throughout the fibres.

The other main method forms the fibres by centrifugally fiberising a mineral melt on a spinner which comprises at least one fiberising rotor which rotates about a substantially horizontal axis and entraining the fibres in air travelling substantially horizontally, and thereby forming a cloud of fibres which travels towards a permeable collector which travels continuously along a collecting path and air is sucked through the collector whereby the fibres accumulate on to the collector as a web as it travels along the path. This type of method is particularly advantageous for many types of melts and the present invention is concerned with it.

In this method, the spinner usually comprises a plurality of fiberising rotors, melt is poured on to the top rotor and each of the rotors rotates about a substantially horizontally axis and the rotors are arranged as a cascade, so that melt from one fiberising rotor is thrown on to the next. This type of spinner is known as a cascade spinner.

Conventionally binder and other additive is to be distributed as uniformly as possible through the product and so it is conventional to supply binder and any additive at the spinner, so that it is entrained with the air in the cloud of fibres and is uniformly mixed into the cloud. As a result, the binder and any additive is uniformly mixed through the web which is collected on the collector.

WO97/32068 describes a process of this general type. However this process achieves substantially uniform distribution of additive in the resultant web by blasting the additive into the cloud of fibres along a direction which leads towards the spinner and which is against the travel of the cloud of fibres. Accordingly the additive is distributed substantially uniformly throughout the cloud and the web.

DE2223683 also describes a cascade spinner process in which additives that are included in the cloud become uniformly distributed.

WO99/51536 is concerned with obtaining a non-uniform distribution of additive throughout the thickness of an MMV fibre product which can be made by various methods.

In one method a plurality of spinners, each of which comprises a fiberising rotor which rotates about a substantially vertical axis, are arranged lengthwise along the collector and the additive is injected into the vertically downward travelling cloud of fibres from one only of the spinners. As a result, the additive is concentrated in the depthwise portion of the web which is formed from that spinner.

In the other methods described in WO99/51536 a web is formed as a result of fiberisation using a cascade spinner wherein each of the rotors is arranged to rotate about a substantially horizontal axis, and the resultant primary web is then cross lapped in conventional manner to form a secondary web. The required non-uniform distribution of the additive through the thickness of the resultant secondary web is achieved either by applying the additive on to part only of the area of the primary web before it is cross lapped to form the secondary web, or by injecting the additive into part only of the overall cloud of fibres in the central region of the primary web, for instance, by having three cascade spinners arranged transversely across the web and by adding the additive only at the central cascade spinner.

The injection of the additive into the cloud of fibres is preferably from within the spinner or from a position closely adjacent the spinner and, in any event, it is preferably from a position which is within the cloud of fibres which is being formed from the spinner.

These methods cause the primary web to have an increased concentration of additive in the region midway between its two edges and cross lapping can then be conducted so as to achieve the required differential concentration of additive in the core of the final, secondary, web.

EP898103 relates to a similar cross lapped system wherein graphite can be included in the whole or a stratum of the product by injection of graphite into the cloud of fibres.

These methods have several disadvantages. They cannot give the desired depthwise distribution in a primary web and necessitate cross lapping. They necessitate controlling the distribution into the desired midway region of the primary web such that the subsequent cross lapping gives the required final distribution in the secondary web. Cross lapping incurs the risk that the particles in the primary web may move, or fall out, during the cross lapping.

It would be desirable to provide a method and apparatus for making an MMV fibre product having a controlled depthwise distribution of additive and which allows easier and more accurate control of the distribution of the additive and which can more easily be applied to conventional apparatus which utilises centrifugal spinners which rotate about a substantially horizontal axis.

In the invention we provide a method of making a man-made vitreous (MMV) fibre product comprising a core layer between adjacent layers, the method comprising:

fiberising a mineral melt using a spinner which comprises one or more fiberising rotors which rotate about a substantially horizontal axis, and entraining the fibres in air travelling substantially horizontally as a cloud of fibres;

collecting the fibres from the cloud as a web on a permeable collector which travels continuously along a path comprising, in sequence, an initial collecting zone, an intermediate collecting zone and a final collecting zone whereby the fibres of the core layer are collected on the collector in the intermediate collecting zone and the fibres of the adjacent layers are collected on the collector in the initial and final collecting zones;

and forming the MMV fibre product from the web;

characterised in that the core layer comprises MMV fibres mixed with dense particulate additive and the adjacent layers comprise MMV fibres optionally mixed with the dense particulate additive in an amount which is substantially less than in the core layer;

and wherein the dense particulate additive is directed downwardly through the cloud of fibres as a region of downwardly directed particles which, at the surface of the web, extends across substantially the entire width of the web and extends in the lengthwise direction substantially only in the intermediate collecting zone.

The invention also provides apparatus suitable for performing this method.

The apparatus comprises a spinner comprising one or more fiberising rotors mounted for rotation about a substantially horizontal axis, means for supplying melt to the spinning apparatus for centrifugal fiberisation by the spinner or spinners, means for supplying air around the spinning apparatus and travelling substantially horizontally for collecting as a cloud of fibres the fibres fiberised on the spinner, a collector which is for collecting fibres from the cloud as a web and which is mounted to travel continuously through a collecting chamber and to carry the web out of the chamber, and means in the top of the chamber for directing the dense particulate additive downwardly through the cloud of fibres as a region of falling particles which, at the surface of the web, extends across substantially the entire width of the web and extends in the lengthwise direction substantially only in an intermediate collecting zone.

The particles are directed downwardly such that they are predominantly all within and throughout the desired region at the surface of the web. It is therefore necessary that they should not be carried out of the desired region as a result of the flow of air which carries the cloud of fibres to the collector.

If the particles have a sufficient density their fall may not be significantly or randomly deflected by that flow of air and so satisfactory results may be achieved by scattering the particulate material downwardly through a slot which has substantially the dimensions of the region of downwardly directed particles at the surface of the web. For instance the collector usually travels through a collecting chamber and a slot may extend across most or all of the width of the top of the chamber under conditions (such as of air flow) whereby the particles which fall through the slot are substantially all collected within the collecting zone over an area similar to or slightly larger than the area of the slot. A simple transverse baffle can extend across the width of the web just below the slot to spread the falling particles in the lengthwise direction if required.

However it is generally preferred to supply the particles initially (into the spinning chamber or cloud) in a stream of air in which they are entrained and which therefore accelerates the particles. Providing an adequately uniform distribution of particles over a wide slot (since the web may often be 2 meters wide or more) can involve apparatus which is inconvenient to construct and to operate, especially when the particles are supplied entrained in a stream of air. It is therefore desirable to achieve the downward supply of dense particulate additive by ejecting a stream of the additive on to the underside of a baffle, or a plurality of streams on to the undersides of a plurality of baffles (i.e., each stream is directed on to the underside of a different baffle). The or each baffle is in or above the upper part of the cloud. The baffle is shaped, or the baffles are shaped, to deflect the additive downwardly as a diverging region of downwardly directed particles which, at the surface of the web, extends across substantially the entire width of the web and extends in the lengthwise direction substantially only in the intermediate collecting zone. Thus, instead of supplying the particles into the cloud as a region of constant width which extends over the width of the web and also over the required length of the web, in the invention it is preferred to supply the particles through a conveniently small apparatus, such as a duct, as a relatively narrow stream of particles and then to cause this stream (or the streams) to be deflected by a baffle (or by the baffles) which causes the region of particles to diverge outwardly widthwise and lengthwise in order that the region has the required dimensions at the surface of the web.

The or each baffle and the means for supplying the stream on to that baffle should be mounted in the top of the cloud or above the cloud so as to minimise the extent to which the ejection apparatus and the baffle may interfere with the travel of the cloud of fibres. Accordingly the baffle and the ejection means are usually either in the top of the spinning chamber or above an opening in the top of the chamber. Conveniently ejection means is above the top of the spinning chamber and the stream of particles is injected through an opening in the top of the chamber on to a baffle positioned in the top of the chamber. In order that the same chamber can be used for processes according to the invention and for processes where no additive is to be applied, it can be convenient to arrange that the baffle is movably mounted so that it is within the chamber when required for use in the invention but can be raised out of the chamber when it is not required.

Appropriate design of the baffle allows for the stream to be injected from any convenient position and orientation relative to the spinner. However it is generally most convenient to inject the stream lengthwise relative to the direction of the path of the collector and, since the path of the collector usually travels lengthwise relative to the substantially horizontal axis of the spinner, the stream is preferably injected lengthwise to the spinner. In WO97/32068 the injection is conducted so that the particles, after injection, travel predominantly towards the spinner, but in the invention it is preferred that the amount of travel of the particles towards the spinner after injection is low since this reduces any tendency for the particles to become distributed homogeneously throughout the cloud. It is therefore preferred that the stream is injected in the length direction away from the spinner, substantially in the length direction of the collecting path.

Thus, instead of achieving a homogeneous distribution of the particulate additive amongst the fibres close to the spinner, as in WO97/32068 and in the preferred embodiment of WO99/51536, in the invention it is preferred that the stream of additive only enters the cloud of fibres at a significant distance from the spinner and is directed away from the spinner.

The baffle (and in particular its underside) can have any shape appropriate for converting the stream of particulate additive into the desired size and shape of the region of falling additive at the surface of the web.

Accordingly it is necessary to select the baffle according both to the configuration of the stream of particles injected on to it and having regard to the dimensions of the region over which the particles are to be distributed on the surface of the web.

If the web has a conventional width of not more than 2 meters then appropriate distribution can usually be achieved by a single baffle to receive a stream of particles from a conventional duct of a few centimeters diameter. However more than one baffle, each receiving particles from a different duct, may be used if required for a 2 meter web and if the web is of greater width then it is usually convenient to use at least two baffles, arranged across the width of the web, each supplied with its own stream of particles.

It is usually desirable that each individual baffle should spread the particles laterally on both sides of the baffle and so the underside of the baffle must be constructed and shaped (relative to the stream of particles) so as to cause the particles which hit the underside to be deflected by the baffle down through a diverging region which, at the surface of the web, extends in the width direction of the web by the desired extent (usually approximately the width of the web or half the width of the web if there are two baffles) and extends lengthwise substantially only for the selected length of the intermediate collecting zone. The baffle can be constructed in any manner that results in this desired spreading effect.

In the lengthwise cross section of the undersurface, the baffle should extend downwardly so as to deflect downwardly the stream of particles which hits the baffle. The downwardly inclined face may be planar but is usually curved smoothly downwardly so to deflect the particles smoothly downwardly towards the desired lengthwise region. Additionally it may be curved laterally to achieve lateral spreading, as explained below. In order to control the lengthwise spread of the region the distal edge of the baffle may curve downwardly more steeply than the remainder of the baffle. Preferably the distal edge of the baffle carries longitudinally extending fingers, which are spaced apart, lengthwise, extensions of the baffle. The length and/or shape of the fingers can be adjustable in order to adjust the length of the intermediate collecting zone. Typically the distal ends of the fingers are curved downwardly more than the remainder of the baffle (and usually more than the proximal ends of the fingers).

The baffle must also be shaped so as to deflect the particles laterally in order that the falling particles fall through a region which diverges both in the lengthwise direction and the widthwise direction.

The lateral spreading may be achieved by providing ribs on the underside of the or each baffle wherein the ribs diverge outwardly in the direction of ejection in order to deflect the particles transversely across the web.

Instead of or in addition to relying on ribs of this type, the undersurface can be shaped so that it has the form of a shallow V, in the form of a central base and a wing which extends upwardly from each side of the base. The combination of the smooth downward inclination of the baffle lengthwise and the transverse shaping of the wing is selected so as to obtain the desired amount of outward deflection of the particles. The inclination of the wings, even at their steepest point close to the base, is usually quite low so that the two wings usually make an angle of at least 160° and frequently 165 or 170° up to about 179°. Put another way, the overall slope of the wings from the base to the outermost point of each wing is generally in the range 1% to 15%, often around 3 to 10%. Each wing usually diverges, so as to promote lateral spreading.

By selecting the configuration of each wing both in the length direction and in the transverse direction, and in particular by selecting the curvature or other inclination at each point both lengthwise and transversely, and/or the position and shape of any longitudinal ribs, it is easily possible to ensure that the particles which strike the baffle are spread across the width of the collector such that, at the surface of the web, the region through which the particles are travelling is substantially co-extensive with the width of the web. Similarly, by selecting the inclination and curvature in the length direction of the baffle (and fingers if present), it is possible to select appropriately the length of intermediate collecting zone over which the particulate additive is collected on to the web.

The particulate additive is preferably directed on to the baffle as a relatively high velocity stream, for instance with the particles travelling at from 10 to 100 m/s, often 20 to 50 m/s (preferably about 30 to 35 m/s), with the velocity of the particles generally being caused predominantly by entraining them in a stream of air.

It is known that it is generally desirable to minimise the amount of turbulence in the cloud of fibres and adjacent to the collecting conveyor, and so it might be thought undesirable to inject a high velocity air stream. However this air stream does not significantly cause turbulence in the cloud of air because the baffle is positioned above the top of the cloud or in the top of the cloud. The air of the air stream is dissipated by the baffle and accordingly the air for entraining the particles does not substantially interfere with the flow of air from the spinner to the collector.

Typically the stream of particles has a width of 30 to 100 mm, preferably around 50 to 70 mm, as it reaches the baffle. The stream may have less height, for instance as a result of the duct having an outlet which has a width greater than its height. The baffle usually increases in width from its leading edge to its trailing or distal edge. The width of the distal edge is typically about 1.5 to 3 times, often about 2 times, the width of the leading edge, and is typically around 150 to 200 mm.

Baffles of the construction and dimensions indicated above can easily be constructed to achieve a satisfactory spread of particles over a web of 2 meters in width and from 1.5 to 5 meters, often around 3 to 4 meters, in the length direction.

The particulate additive must be dense in the sense that it has sufficient density (having regard to its shape) to travel through the travelling cloud of fibres without the particulate additive being uncontrollably deflected by the cloud. In most processes there is substantially no deflection of the travelling particles by the travelling cloud. However some deflection of the particulate additive in the length direction by the travelling cloud of fibres is acceptable provided that it is constant, since the baffle can then be designed to give the desired overall lengthwise spreading have regard to whatever spreading may be caused by the cloud.

In practice the deflection by the air in the cloud is usually insignificant because substantially all particulate additives that might be contemplated for use in the invention usually have a minimum dimension of at least 0.5 mm, often at least 1 mm. The particulate additive is usually non-fibrous with the result that its three dimensions are usually not significantly different from one another. The particulate additive typically has a mesh size wherein at least 70% by weight of the additive, and preferably at least 80% and most preferably at least 90%, by weight of the additive has a mesh size of 0.5 mm to 10 mm, most preferably 2 to 5 mm.

The bulk density of the additive (i.e., the density of the additive when it is collected in a container of known volume without application of vibration or external downward pressure) is generally at least 50 kg/m$^3$ and most preferably at least 100 kg/m$^3$, and generally above 500 kg/m$^3$, typically 1200 to 2000 kg/m$^3$.

Suitable dense particulate additives include hydrophilic materials such as clay or ground minerals or mixtures thereof, added to promote hydrophilic properties (for instance in horticultural and other media). Dense, heavy additives can be used for acoustic insulation products. Preferred additives are fire retardant additives.

Suitable preferred fire retardant additives are described in WO-A-97/20780 and WO 99/51536. Preferred materials include carbonates and hydrates which decompose endothermically at a temperature above 200° C. Suitable materials are magnesium hydroxide, calcite (calcium carbonate), dolomite, siderite, aragonite, magnesite, brucite, magnesium carbonate, barium carbonate, barium hydroxide, ferric hydroxide, ferrous hydroxide, pyrite, and silicon compounds with water of crystallisation. Magnesium hydroxide is preferred.

Heat stable endothermic particulate materials can be used. They are materials which have the chemical property that their molecules do undergo endothermic decomposition at temperatures below 200° C. but are provided in such a form that they are protected from exposure to high temperature and the particles do not undergo substantial decomposition when the product in which they are contained is subjected to temperatures up to 200° C. Preferred materials of this type are aluminium hydroxide, which liberates all of its water of crystallisation at about 185° C. when in fine grain form, but in coarse grain form is stable up to 200° C.

The relative lengths of the intermediate and final collecting zones are selected according to the desired relative thicknesses of the core and adjacent layers. If the thickness of the web increases substantially linearly along most of the length of travel of the conveyor then the length of each zone will be directly proportional to the desired thickness of each zone. If the rate of collection along the length of the collector is not directly proportional to the length of travel, then the length of each zone must be selected appropriately in order that the required relative depth is achieved in each zone.

Usually it is required that the core layer (and often therefore the length of the intermediate collecting zone) should be at least 20% and often 30% of the total but usually not more than 80% and usually less than 70% of the total, with a thickness of around 30 to 60%, for instance 40 to 50%, often being preferred. The core is usually substantially central so that each facing layer is of substantially the same thickness, but if desired the facing layers may have a different thickness, for instance in a ratio typically of not more than 1:3.

The continuously travelling collector is usually a flat collector which usually travels continuously away from the spinner so as to carry the web away from the spinner to subsequent apparatus for converting it to the final product. The collector is usually substantially horizontal but can be usually inclined upwardly at an angle of, for instance, 10 to 60°, but usually not more than about 45°. Alternatively the collector can be a drum-shaped collector travelling towards or away from the spinner.

Although it is possible to perform the invention using a single fiberising rotor which rotates about a substantially horizontal axis for forming the cloud of fibres, in practice the spinning apparatus usually has a plurality of fiberising rotors. Preferably a cascade spinner is used comprising at least two, and preferably three or four, spinning rotors each mounted for rotation about substantially horizontal axes where the second rotor is positioned to receive melt thrown from the top, (first) rotor and, if present, subsequent rotors are arranged to receive melt in sequence thrown off the previous rotor. Suitable cascade spinners are described in WO92/06047, WO96/02068, WO96/05299 and WO96/18585. There may be a single cascade spinner providing the cloud of fibres collected on the collector or there may be two or more cascade spinners arranged in side-by-side relationship. The melt is usually a rock, stone or slag melt.

Binder is usually injected at the or each spinner, and optionally also around the spinners, so as to achieve a uniform distribution of binder in the cloud, in conventional manner.

The overall conditions of fiberisation, air flow in the cloud, collection on the collector and ejection of the particulate additive is usually controlled so that the dense particulate additive is located substantially only in the zone where it is required. Accordingly, the additive is preferably distributed in a substantially uniform concentration, per unit area, across the width up to close to the edges, which may be cut off and recycled in conventional manner if required.

The concentration per unit area lengthwise preferably shows a very clear increase in the intermediate collecting zone and in the resultant core, relative to points distant from that. Although there can be, for instance, a "background" concentration of the additive throughout some or all of the initial and final zones and therefore the adjacent layers, the arrangement is preferably such that it is easily possible to observe, both in the zones and in the layers, a region containing at least 70% of the total weight, and preferably at least 80 to 90%, of the total weight of the dense particulate additive (and which is thus the core layer or the intermediate collecting zone) and the other regions which, in total, preferably do not contain more than 10% or, at the most, 20% of the total amount of additive. Preferably the process is conducted so that a region can easily be observed containing at least 90%, and preferably at least 95%, by weight of the total additive, and this region is the intermediate collecting zone and the core layer.

After collecting the web containing the core layer between the adjacent layers, the web is then converted into an MMV fibre product, which is usually a cured batt, which may be flat or shaped (for instance as a pipe section). Accordingly, the web contains curable binder and the product is made from the web in conventional manner by a process comprising curing the binder, often after intermediate steps such as compression, and/or laminating at least two layers of the web, or laminating the web with a facing MMVF web, or a sheet of conventional construction, on either or both faces. The cured product can be converted into fire doors, wall panels, growth media or other commercial products in conventional manner.

The density of the final product, in the absence of the particulate additive, is usually at least 30 kg/m$^3$ and is usually at least 60 or 100, and most preferably at least 130 kg/m$^3$. For instance the wool density is typically 160 kg/m$^3$ although it can be up to 200 or even 250 kg/m$^3$ or higher.

The concentration of the particulate additive material in the core section (and which therefore is additional to the fibre density in that section) is preferably from 10 to 250, preferably 50 to 200, kg/m$^3$. With fire retardant additives, the amount is generally 100 to 200 kg/m$^3$, for instance 130 to 180 kg/e. These values are all for the weight per unit volume of the additive in the area defined by the full product. Typically the particulate additive is 20 to 60% by weight, preferably from 40 to 50% by weight, of the final product. The core layer contains MMV fibres (from the cloud of fibres) which extend through the core layer and which intermesh with, and bond with, the fibres in the adjacent layers. The amount by weight of MMV fibres in the core layer is usually at least 5%, e.g., 10 to 50, preferably 20 to 40% by weight of the core layer.

The invention is now described in more detail with reference to the accompanying drawings in which:

FIG. 9 is a diagrammatic illustration (not to scale), of a side view of a baffle for use in the invention.

Figure 1:
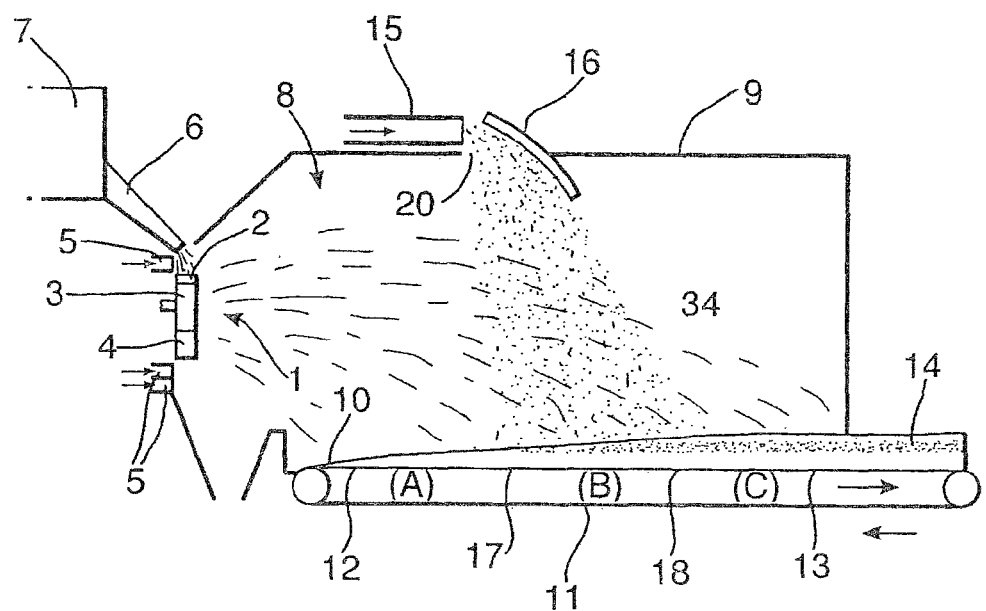
FIG. 1 is a diagrammatic illustration (not to scale) of apparatus in use in the process of the invention.

The apparatus of FIG. 1 comprises a cascade spinner 1 having a plurality of rotors 2, 3 and 4 arranged as a cascade in conventional manner whereby each rotor rotates about a substantially horizontal axis, and wherein the cascade is provided with air ducts 5 through which air is forced substantially horizontally around the rotors and therefore the entire spinner. Mineral melt is fed down a gutter 6 from a furnace 7 on to the top rotor off which it is thrown centrifugally in sequence on to the other rotors, whereby fibres are thrown off the rotors and are entrained in the air from one or more air ducts 5. The fibres are carried forwards from the rotors as a cloud of fibres into a collecting chamber 8 which has a roof 9 and a base 10 defined by a continuously moving permeable collector. The collector travels substantially horizontally away from the spinner and thus fibres gradually accumulate on the collector as it travels from an initial position 12 (below which substantially no fibres are collected) to a final position 13, at which the web 14 has reached its final maximum depth.

A duct 15 ejects a stream of dense particles on to the underside of a baffle 16 which is positioned in an opening 20 in the roof 9 to deflect the particles downwardly on to the collector. The arrangement of the ejector and the baffle is such that the stream 34 of particles is spread out laterally and longitudinally so as to extend across substantially the entire width of the web and so that substantially all the particles are collected on the web between points 17 and 18. Accordingly the initial collecting zone (A) extends between points 12 and 17, the intermediate collecting zone (B) extends between points 17 and 18 and the final collecting zone (C) extends between points 18 and 13.

Figure 2:
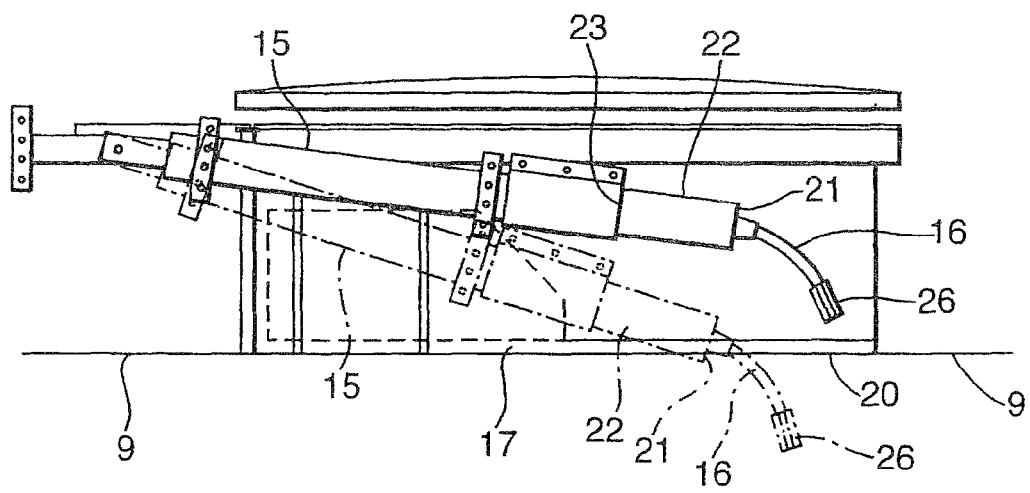
FIG. 2 is a diagrammatic illustration of two positions between which the baffle and ejection apparatus may be moved.

The baffle 16 can be partly inside and partly outside the chamber during operation but usually it is mainly or wholly inside the chamber. In order that the chamber can be used for normal manufacture when the baffle is not required, preferably the baffle is adjustable between an operating position and a dormant position. These two positions are shown in FIG. 2 where the dormant position is in solid line and the operating position is in dashed line. Preferably there is a slide 17 which is slid backwards to provide the opening 20 when required and which is then slid forwards to close the opening when the baffle 16 has been raised to the dormant position.

Figure 3:
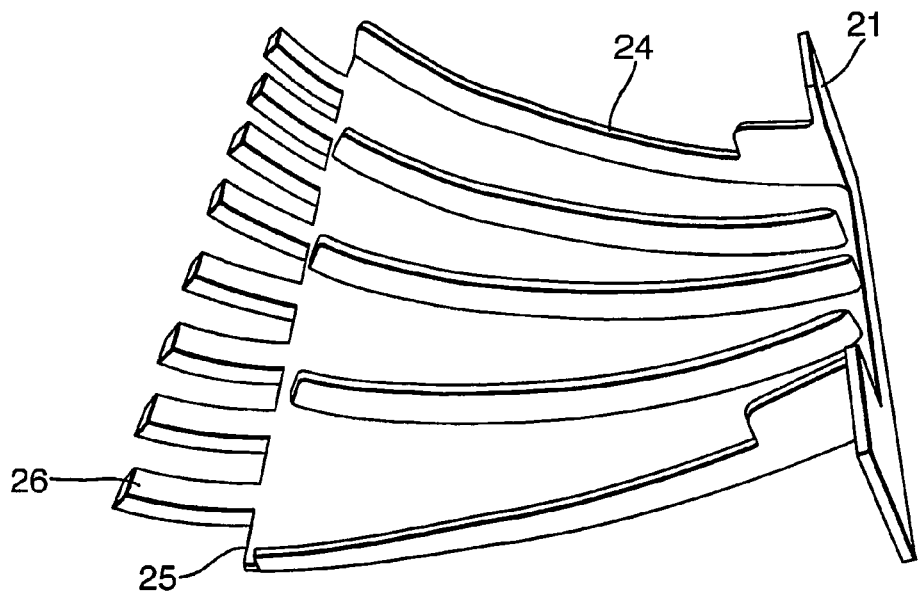
FIG. 3 is a perspective view of the underside of a baffle for use in the invention.
Figure 4:
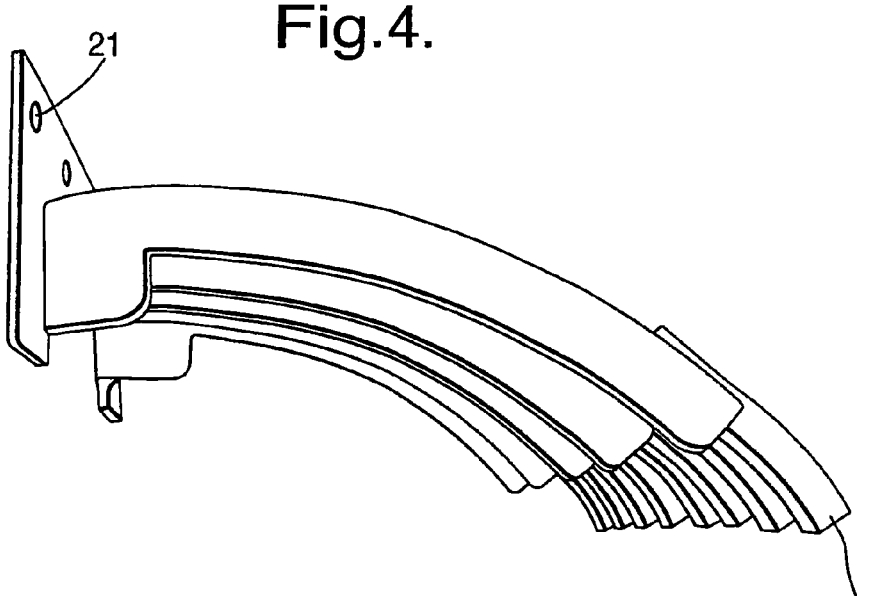
FIG. 4 is a side view of the same baffle.
Figure 5:
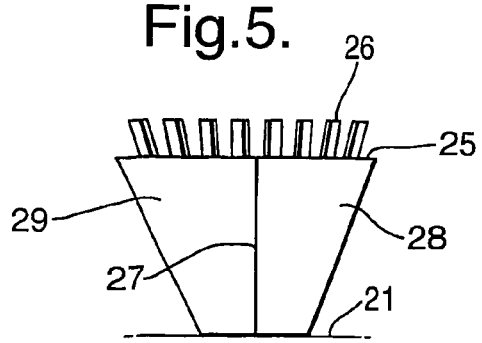
FIG. 5 is an under view of a different baffle for use in the invention.
Figure 6:
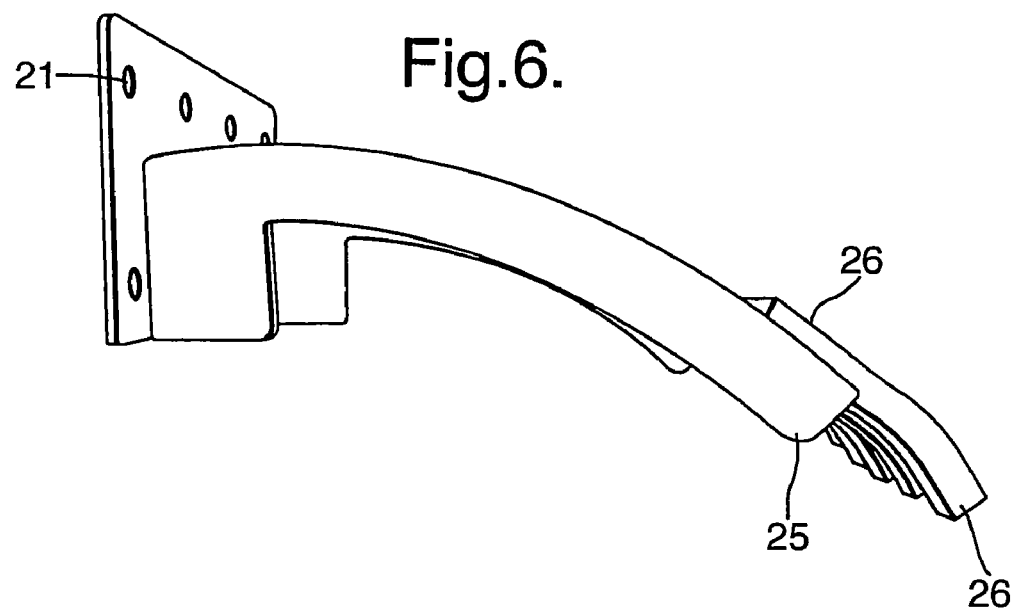
FIG. 6 is a side view of the same baffle.
Figure 7:
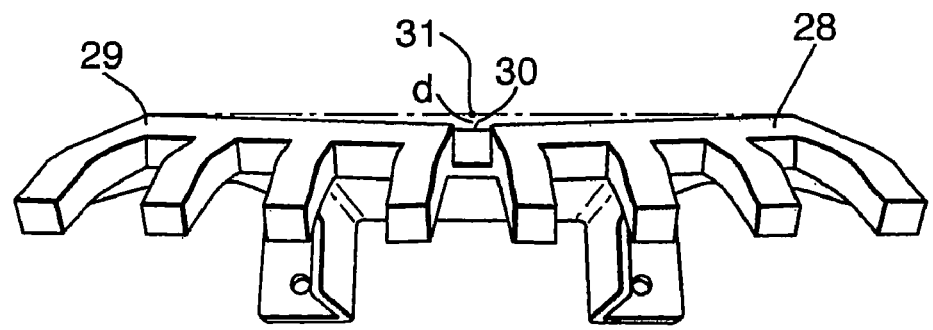
FIG. 7 is a view from beyond the distal end of the extensions shown on the baffle of FIG. 6.
Figure 8:
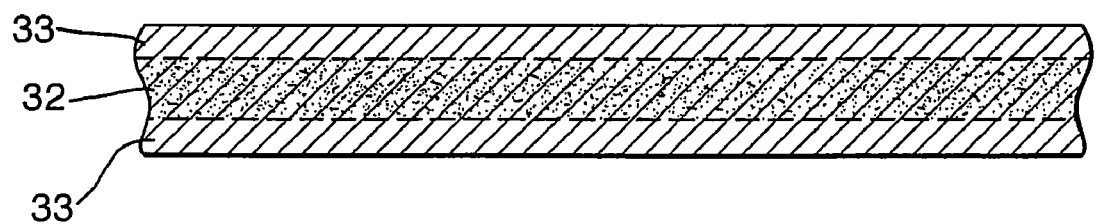
FIG. 8 is a cross section of a product made by the invention.

One preferred baffle is shown in FIGS. 3 and 4 and comprises a baffle plate 21 by which the plate can be mounted on a suitable open framework 22 rigidly connecting the baffle to the outlet 23 of the ejector 15. As shown in FIGS. 3 and 4, the baffle is curved downwardly and carries on its underside diverging ribs 24 for promoting lateral spreading of this stream of particles. The distal end 25 of the baffle carries spaced-apart extensions or fingers 26 which are similarly curved downwardly. The varying length and angulation of the underside of the baffle which is encountered by the stream of particles results in increased lengthwise spreading (i.e., increased distance between points 17 and 18) than is obtainable if the distal end is a uniform straight edge.

In FIGS. 4 and 6 the extensions 26 at the distal end 25 of the baffle are curved downwardly at a similar angle to the plate. However, as shown in FIG. 9, it is preferred for the protrusions 26 to curve downwardly more steeply that the remainder of the baffle.

Instead of or in addition to having the ribs 24, the underside of the plate can be as shown in FIGS. 5 to 7. The underside of the plate in FIG. 5 is shown as having a central base 27 and wings 28 and 29 which extend slightly upwardly from the base 27. The view shown in FIG. 7 (of the ends of the fingers 26) indicates the degree of upward inclination. It will be apparent that this can be quite small, since the combination of the curve in the lengthwise direction and the outward spreading of the baffle between the front edge which includes the mounting 21 and the distal edge 25 can thereby easily result in the desired lateral and longitudinal spreading of the stream of particles. In a typical example the width of the distal edge 25 across the entire baffle is typically 150 to 200 mm and the extent by which each wing 28 and 29 is inclined upwardly from the base 30 is indicated by the small distance “d” between point 30 and point 31. Typically the inclination is such that the distance between points 30 and 31 (i.e., the extent to which each wing extends upwardly) is between 2 and 15 mm, usually around 5 to 10 mm, when the width of the distal edge 25 is 150 to 200 mm.

FIG. 8 is a cross-section of a cured batt having a core layer 32 between two facing layers 33. The core layer 32 and the facing layers 33 all have substantially the same content of binder and mineral fibre, but the core layer 32 has a very much higher concentration of magnesium hydroxide particles or other particulate additive than the facing layers, which are preferably substantially free of the additive.

The invention claimed is:

1. A method of making a man-made vitreous (MMV) fibre product comprising fibers of a core layer between fibers of adjacent layers and comprising fiberising a mineral melt using a spinner comprising one or more fiberising rotors which rotate about a substantially horizontal axis, and entraining fibres in air traveling substantially horizontally as a cloud of fibres, collecting the fibres from the cloud as a web on a permeable collector which travels continuously along a path comprising, in sequence, an initial collecting zone, an intermediate collecting zone and a final collecting zone whereby the fibres of the core layer are collected on the collector in the intermediate collecting zone and the fibres of the adjacent layers are collected on the collector in the initial and final collecting zones, and forming the MMV fibre product from the web, characterized in that the core layer comprises MMV fibres mixed with dense particulate additive and the adjacent layers comprise MMV fibres optionally mixed with the dense particulate additive in an amount which is substantially less than in the core layer, and wherein the dense particulate additive is directed downwardly through the cloud of fibres as a region of downwardly directed particles which extends, at the surface of the web, across the width of the web and in the length direction substantially only in the intermediate collecting zone.

2. A method according to claim 1 in which the region of downwardly directed particles is provided by ejecting a stream in air of the particulate additive on to the underside of a baffle, or by ejecting a plurality of streams in air each on to the underside of a different baffle, wherein the baffle or each baffle is in the upper part of the cloud or above the cloud of fibres and wherein the baffle is shaped, or the baffles are shaped, to deflect the dense particulate additive downwardly as a diverging region of falling particles which, at the surface of the web, extends substantially across the width of the web and extends lengthwise substantially only in the intermediate collecting zone.

3. A method according to claim 2 in which the stream in air of the dense particle additive or the plurality of streams in air is directed substantially in the length direction of the path away from the spinning apparatus.

4. A method according to claim 3 in which the underside of the baffle or each baffle has spaced-apart extensions on its distal edge in order to increase the length of the intermediate collecting zone.

5. A method according to claim 2 in which the baffle or each baffle carries ribs on its underside which diverge outwardly in the direction of ejection in order to deflect the region of downwardly directed particles transversely across the web and/or the underside of the baffle or each baffle comprises a base and a wing extending upwardly from one or both sides of the base and shaped to deflect the region of downwardly directed particles transversely across the width of the web.

6. A method according to claim 1 in which at least 70% by weight of the dense particulate additive has a minimum dimension of at least 0.5 mm and/or has a bulk density of at least 500 kg/m$^3$.

7. A method according to claim 1 in which the intermediate collecting zone is of a length such that 20 to 70% of the thickness of the web is collected in the intermediate collecting zone and 10 to 40% of the thickness of the web is collected in each of the initial and final collecting zones.

8. A method according to claim 1 in which the cloud of fibres includes curable binder and a single layer of the web is passed through a curing oven to produce a bonded batt having a fibre density of 30 to 200 kg/m$^3$ and wherein the additional density due to the dense particulate additive is 20 to 60% by weight of the product.

9. A method according to claim 1 in which the fibres are of rock, slag or stone wool and the dense particulate additive is selected from fire-retardant additives for improving fire-retardant properties, acoustic additives for improving acoustic properties or hydrophilic additives for improving horticultural properties.

10. Apparatus for forming a man-made vitreous fibre product comprising a core layer between adjacent layers wherein the core layer comprises dense particulate additive and the adjacent layers are substantially free of the dense particulate additive, the apparatus comprising a spinner including at least one fiberising rotor mounted for rotation about a substantially horizontal axis, means for supplying melt on to the spinner, means for supplying air around the spinner and traveling substantially horizontally for collecting as a cloud of fibres that were fiberised on the spinner, and a collector which is for collecting fibres from the cloud as a web and which is mounted to travel continuously through a collecting chamber and to carry the web out of the chamber, characterized in that there are means in the top of the collecting chamber or above the collecting chamber for directing the dense particulate additive downwardly through the cloud of fibres as a region of falling particles which, at the surface of the web, extends widthways substantially across the width of the web and extends lengthways substantially only in an intermediate collecting zone between initial and final collecting zones which are substantially free of the dense particulate additive.

11. Apparatus according to claim 10 wherein the means for directing the dense particulate additive downwards, comprises a baffle or a plurality of baffles and means for ejecting a stream in air of the particulate additive on to the underside of a baffle, or a plurality of streams in air each on to the underside of a different baffle wherein the baffle is shaped, or the baffles are shaped, to deflect the dense particulate additive downwardly as a diverging region of falling particles which, at the surface of the web, extends substantially across the width of the web and extends lengthwise substantially only in the intermediate collecting zone.

12. Apparatus according to claim 11 wherein the underside of the baffle or each baffle has spaced-apart extensions on its distal edge.

13. Apparatus according to claim 11 wherein the baffle or each baffle carries ribs on its underside which diverge outwardly towards the distal edge.

14. Apparatus according to claim 11 wherein the underside of the baffle or each baffle comprises a base and a wing extending upwardly from one or both sides of the base and shaped to deflect the particles transversely across the width of the web.

15. Apparatus according to claim 11 wherein the baffle or each baffle is adjustable between an operating position which is partly within the collecting chamber and a dormant position which is above the collecting chamber.

* * * * *